(43.)  4 Sheets--Sheet 1.
E. SPANGLER.
Improvement in Combined Cultivator and Planter.
No. 122,861.  Patented Jan. 16, 1872.
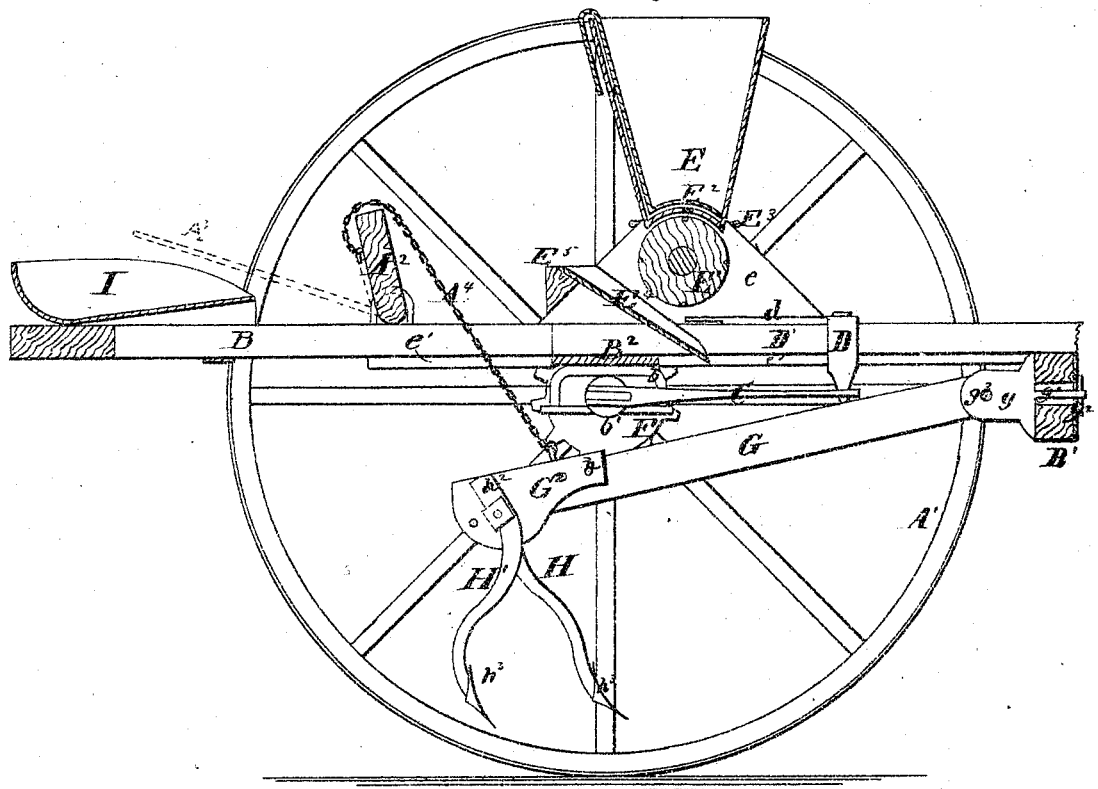
Witnesses
F. B. Curtis
O. D. Kane
Inventor
Emanuel Spangler
Chipman Hosmer & Co
Attys.

E. SPANGLER.
Improvement in Combined Cultivator and Planter.
No. 122,861.  Patented Jan. 16, 1872.
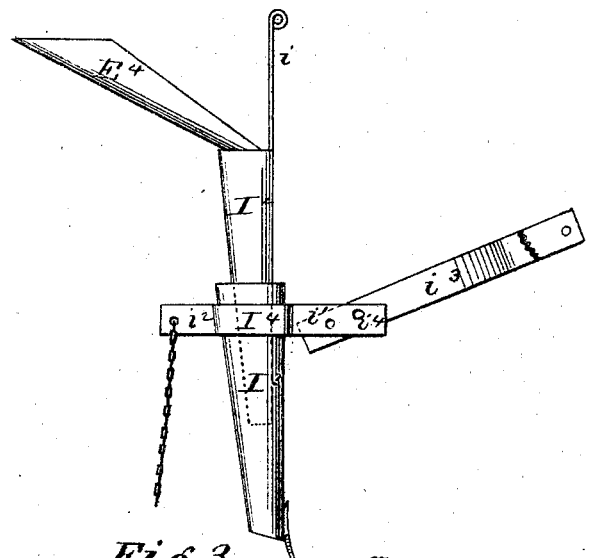
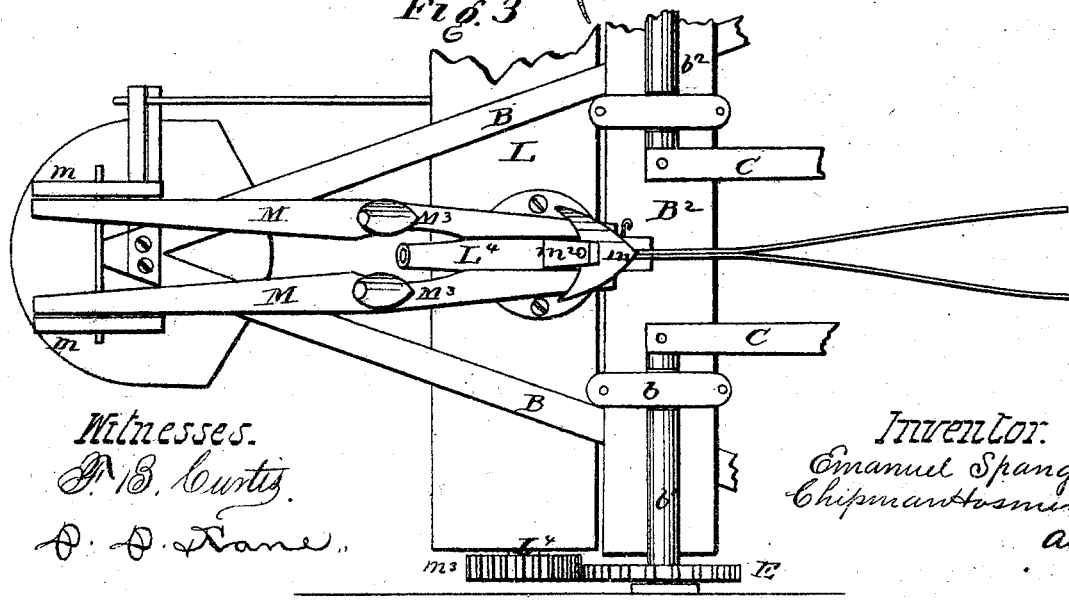

(43.)
4 Sheets--Sheet 3.

E. SPANGLER.
Improvement in Combined Cultivator and Planter.
No. 122,861.  Patented Jan. 16, 1872.

Witnesses
F. B. Curtis
O. D. Kane

Inventor
Emanuel Spangler
Chipman, Hosmer & Co
Attys (43.)  4 Sheets--Sheet 4.
E. SPANGLER.
Improvement in Combined Cultivator and Planter.
No. 122,861.  Patented Jan. 16, 1872.
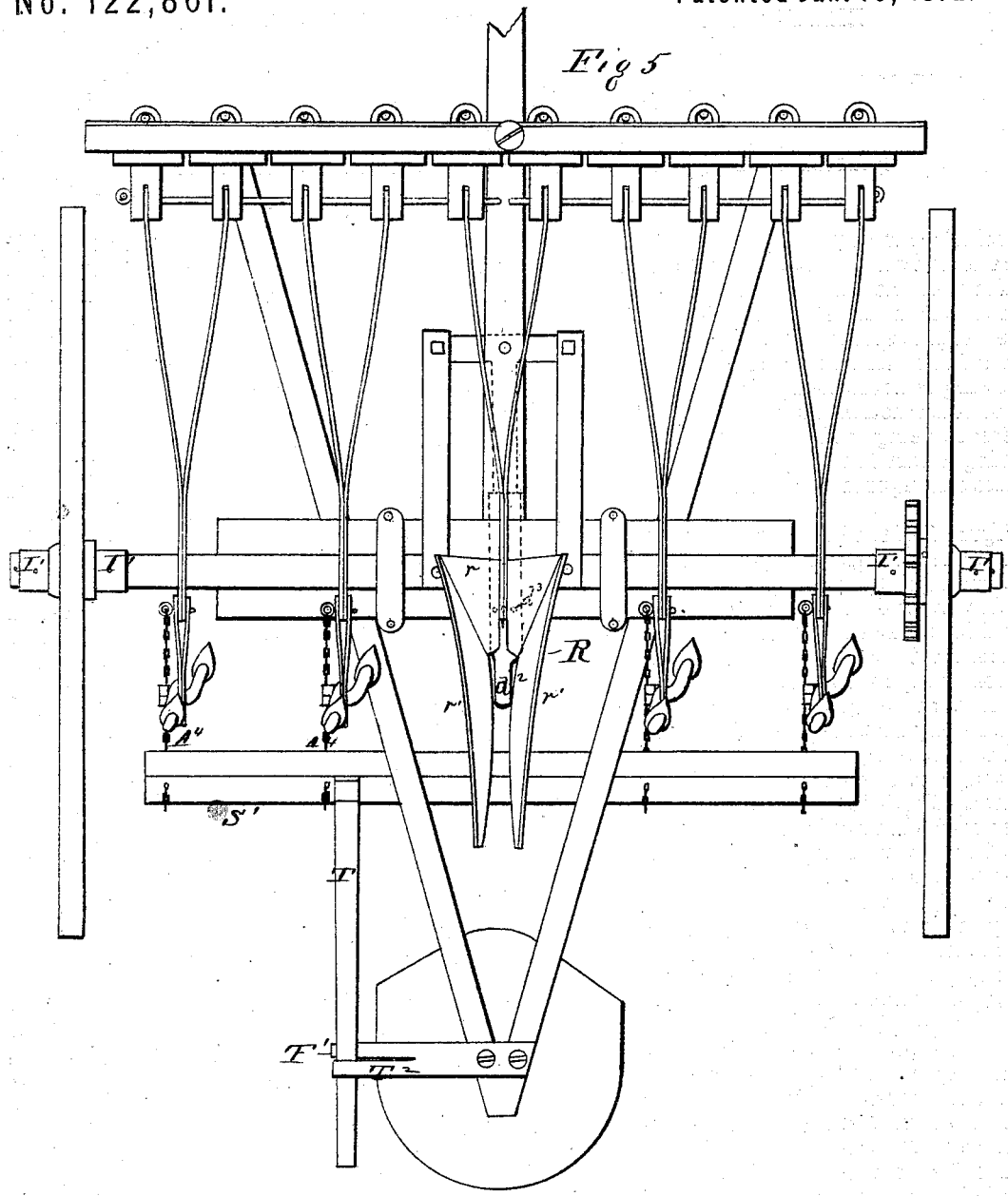
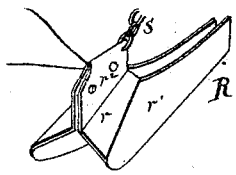
Witnesses
F. B. Curtis
O. D. Lane
Inventor
Emanuel Spangler
Chipman Hosmer & Co.
Attys.

No. 122,861

UNITED STATES PATENT OFFICE.

EMANUEL SPANGLER, OF YORK, PENNSYLVANIA.

IMPROVEMENT IN COMBINED CULTIVATORS AND PLANTERS.

Specification forming part of Letters Patent No. 122,861, dated January 16, 1872.

*To all whom it may concern:*

Be it known that I, EMANUEL SPANGLER, of York, in the county of York and State of Pennsylvania, have invented a new and valuable Improvement in Combined Cultivator and Planter; and I do hereby declare that the following is a full, clear, and exact description of the construction and operation of the same, reference being had to the annexed drawing making a part of this specification, and to the letters and figures of reference marked thereon.

Figure 4:
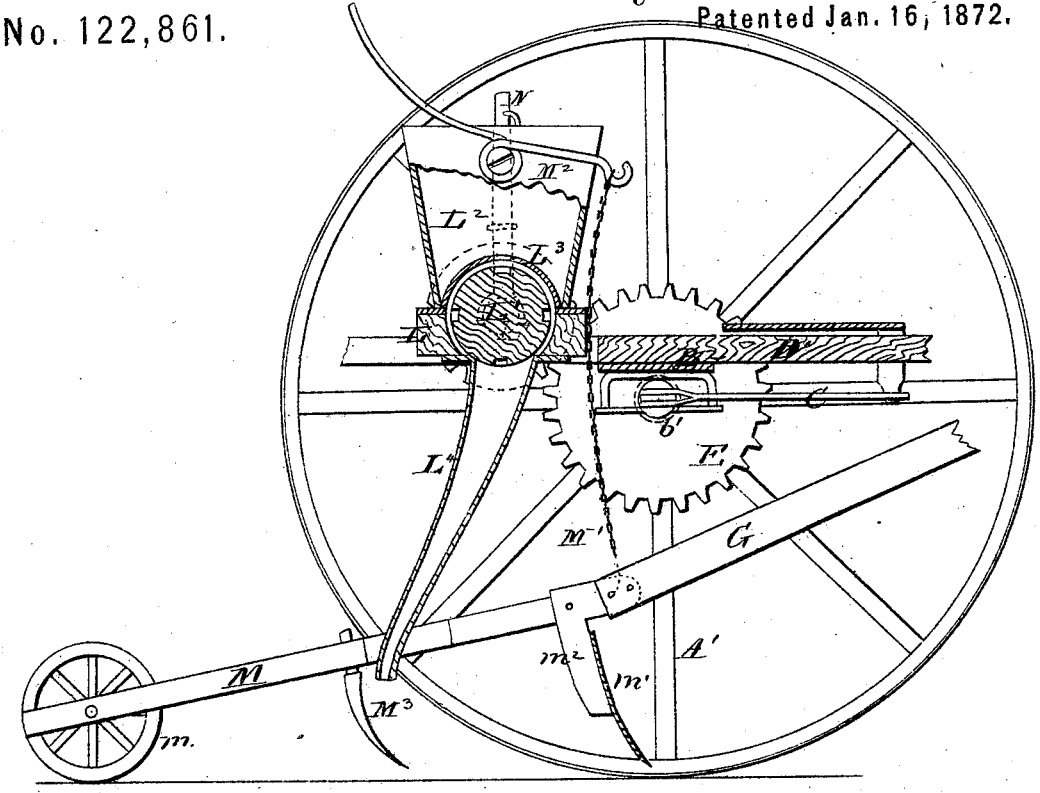
Figure 7:
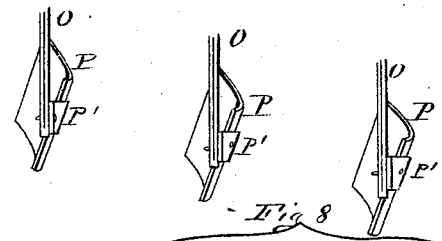
Figure 8:
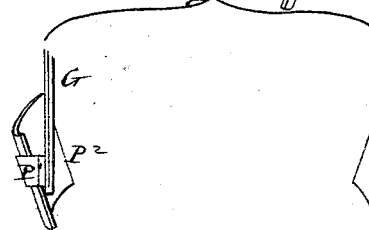

Figure 1 of the drawing is a representation of a vertical longitudinal section of my invention arranged for sowing broadcast. Fig. 2 is a side view of devices used for sowing in drills. Fig. 3 is an under-side view of corn-planter attachments. Fig. 4 is a vertical longitudinal section of my invention, adapted to the planting of corn. Fig. 5 is an under-side view, showing my invention adapted to the cultivation of sprouting corn. Fig. 6 is a detail view, showing device used with sprouting-corn cultivator. Fig. 7 is a detail view, showing devices used with my invention as a cultivator. Fig. 8 is a view showing arrangement of devices to adapt my invention to use as a cultivator of grown corn.

My invention has relation to an improved combination agricultural implement; and the novelty consists in the construction, adaptation, and arrangement of certain interchangeable and co-operative devices, by the proper use and application of which the said implement may be employed interchangeably as a broadcast seed-sower, seed-drill, corn-planter, corn-coverer, corn-cultivator, and general earth-cultivator, as hereinafter described.

In order that the nature of my invention may be clearly understood, I shall proceed to describe the construction of devices, and their respective arrangements in a methodical manner. I shall describe the implement first as a broadcast seed-sower.

In the accompanying drawing, A A′ designate a pair of driving-wheels, arranged on opposite sides of a main frame, which is of a triangular shape, and consists of the side bars B and forward transverse bar $B^1$. $B^2$ represents a transverse bar or plate, secured to the under side of the frame and provided with loops $b$, brackets, or their equivalents supporting the axles $b^1$ $b^2$ of the wheels A A′. The axles $b^1$ $b^2$ are also pivoted to the plate $B^2$ near its ends, and are or may be notched on their under sides to fit the stirrups or loops $b$. C designates levers pivoted to the inner ends of the axles $b^1$ $b^2$, and connected by means of a bent lever or bell-crank, D, which is pivoted to the upper side of the tongue D′. The arm $d$ of said lever extends along the tongue toward the rear end of the implement. E indicates the seed-box, supported above the frame by means of side standards $e$. $E^1$ indicates an ordinary seeding-cylinder, arranged underneath the seed-box E. $E^2$ designates an adjustable slide adapted to cover and uncover the seed-openings in the bottom of the seed-box. $E^3$ is a rod embracing the seed-box near its bottom part. $E^4$ represents inclined seed-spouts, set in or secured to a transverse bar, $E^5$, resting against the standards $e$, and arranged so as to receive the contents of the seed-cylinder and deposit them on the ground. F denotes a toothed wheel on the axle $b^1$, and secured to the hub of the wheel $A^1$. Said toothed wheel engages with another toothed wheel, $F^1$, on one end of the seed-cylinder. G designates a number of bifurcated shovel-beams hinged to the forward end of the main frame. $g$ indicates slotted brackets, furnished with loop shanks $g^1$, which are passed through longitudinal slots in the bar $B^1$, and fastened by means of vertical pins $g^2$. Each arm of a bifurcated beam fits in the notched or slotted end of a bracket, $g$. The beams G are held in place by means of horizontal rods $g^3$ running through the brackets $g$. Secured to the rear ends of the beams G are the doubled plates $G^2$. These plates are pivoted so that they may be allowed to give, and break the relieving-pins $h$ when the shovels are obstructed. H $H^1$ indicate shovel-shanks or standards, pivoted to the doubled plates $G^2$, one on either side of each plate. These shanks are kept rigid by means of the fragile relieving-pegs $h^2$, and are bent respectively toward the forward and rear ends of the implement, as shown in the drawing. On the ends of said shanks are the shovels $h^3$, which along with the shanks, have a slight laterally-oblique pitch, so that they may not progress in the same direct line one behind the other.

It will be observed that the standards $e$ rest on removable side pieces $e^1$, which are supported on the axles $b^1$ $b^2$ and the bar $B^1$, and which are bolted to the latter. $A^2$ designates a transverse bar, hinged to the side bars $e^1$, and operated by a lever, $A^3$. $A^4$ designates chains hooked to the back part of the bar $A^2$; thence brought over the upper edge, and down to the shovel-beams, and attached to the pins which secure the doubled plates $G^2$ to said beams. The bar $A^2$ and chains $A^4$ are designed for the purpose of raising the beams above the ground by the pressing down of the lever $A^3$, which turns the bar back. I designates the driver's seat, attached to the frame at its rear end. $I^1$ designates collars placed on the axles $b^1$ $b^2$, outside or inside the wheels A $A^1$, for the purpose of keeping the wheels in their proper positions. according to the purpose for which the implement is applied, whether as a broadcast seed-sower, corn-planter, cultivator, or other implement.

In order to change the implement from a broadcast seed-sower to a seed-drill, I provide the devices shown in Fig. 2. In this figure $I^2$ designates a seed-spout, having a vertical arm, $i$, which has a loop on its upper end, by means of which it is hung on the rod $E^3$, in front of the seeding-cylinder. $I^3$ indicates a seed-drill, provided with a collar, $I^4$, encircling its upper end. This collar is furnished with arms $i^1$ $i^2$, extending respectively forward and back, as shown. To the arm $i^1$ is pivoted a bifurcated beam, $i^3$, held firmly by a relieving peg, $i^4$. $A^4$ designates a chain attached to the arm $i^2$. For the purposes of the change I remove the beams G and their attachments, and substitute the devices shown in Fig. 2. I attach the beams $i^3$ to the brackets, which hold the shovel-beams, and connect the cords or chains $i^5$ to the bar $A^2$. I hang the seed-tubes $I^1$ so that the spouts $E^4$ shall enter their upper ends and convey the seeds through them to the drills. The beams $i^3$ are shorter than the beams G. The spouts $I^1$ enter the drill-tubes, and the latter are allowed a vertical play adapted to the irregularities of the ground. The drills are raised and lowered in the same way as the shovels.

To adapt the implement to the planting of corn, I remove the seed-box and its attachments by detaching the side bars $e^1$. I also remove the drill-tubes, beams $i^3$, and bar $A^2$, and then move the wheels A $A^1$ as close together as possible, securing them in position by means of the collars on the axles, after which I attach and arrange properly the corn-planting devices, shown in Figs. 3 and 4. In Figs. 3 and 4, L represents a bed-piece bolted to the bars B, and constructed with a cylinder opening to hold a cup-cylinder, $L^1$, which is journaled to said bed, and rotates at the bottom of a hopper, $L^2$, which is built on said bed, and which has a convex perforated bottom, $L^3$. $L^4$ designates a bent grain-spout attached to the under side of the bed L, and communicating with the hopper through the medium of the seed-cylinder $L^1$. When used as a corn-planter the implement is deprived of all but the middle one of the shovel-beams G. To this beam is attached a corn furrow-plow and cultivator, of which M represents the frame, supported in the rear by two wheels, $m$ $m$. $m^1$ represents a furrow shovel attached to an L-shaped beam, $m^2$, which is hinged to the forward end of the frame M, and pivoted to the beam G. $M^1$ designates a chain, which is attached to the end of the beam G, or to the frame M, and also to the end of a lever, $M^2$, pivoted to one end of the hopper, and used for the purpose of raising the furrow-shovel from the ground, and for regulating the depth of the furrow. The tube or spout $L^4$ passes down between the side bars of the frame M. $M^3$ indicates the coverers or ridge-teeth, attached to the frame M behind the spout $L^3$. $M^4$ designates the shaft of the cylinder $L^1$, provided with a toothed wheel, $m^3$, which engages with the wheel F. The shaft $M^4$ is adjustable longitudinally to close and open the seed-cups, and for this purpose is moved by means of a forked lever, N, hinged to one end of the hopper. The forked end of said lever embraces a part of the shaft grooved to receive it.

To adapt the implement to use as a cultivator or machine for second plowing, I arrange a number of beams, O, of gradually-increasing length, in the same manner as the beams G, and secure to their outer ends the rectangular concave-faced oblique shovels P, having standards $P^1$. I dispense with all the removable elements of the corn-planter not essential to the purposes of a cultivator, and move the wheels A $A^1$ as far apart as required, keeping them in position by means of the collars around the axles, and by suitable linch-pins. To the end of the arm $d$ I attach a lever arm, $d^2$, perforated at $d^3$ to render it capable of being secured at different points. This lever is designed to be pivoted to the upper side of the draft-pole, and is used for the purpose of changing the angles of the wheels A $A^1$, through the medium of its connections. To fit the end of the arm $d$ the end of the lever may be made tube-like or flanged.

Fig. 6 represents my invention arranged as a corn-cultivator. The beams G are employed, and all but the middle one thereof provided with shovels, as specified in the description of the seed-sower. The middle beam I provide with a span-plow or scraper, R, which has an inclined forward end, $r$, and long converging sides or wings, $r^1$. The lower edges of these wings are runner-shaped. This scraper is made from a sheet of metal bent to the proper form, and constructed with a raised, double-sided or arch standard, $r^2$, which is pivoted to the beam, held rigid to it by means of a relieving peg, and suspended by an adjustable chain, S, which is retained by a pin or stud on the draft-pole. $S^1$ indicates a transverse bar hinged to the bars B, and furnished with an operating lever, T. To said bar are attached the chains $A^4$, as shown. The scraper R is designed for use in cultivating sprouting corn, on either side of and above which it may pass. The scraper R gathers the earth, breaking it and casting it back over its sides. The sides of said scraper allow the earth to fall back to form ridges, after the manner of cultivator-teeth.

For the purpose of adapting the implement to the cultivation of corn grown too high for the service of the scraper R, I remove the scraper, its beam, and the shovels on either side. I then secure to the beams, from which the shovels have been taken, the two concave rectangular shovels, shown in Fig. 8, one of said shovels being of the series before described, and the other, $P^2$, of a similar form, but facing differently. I attach or connect the beams to the bar $S^1$, as before described, by means of the chains already arranged for connection. $T^1$ $T^2$ indicate a pair of bent arms or catches, secured to the bars B under the driver's seat, and intended to hold the levers by which the bars $A^2$ $S^1$ are operated.

Having thus fully described my invention, what I claim as new, and desire to secure by Letters Patent, is—

The frame B $B^1$, wheels A $A^1$, and gear-wheels E, constructed substantially as described, and adapted for interchangeable use, with the respective devices and apparatus specified and shown, and for the purpose set forth.

In testimony that I claim the above I have hereunto subscribed my name in the presence of two witnesses.

EMANUEL SPANGLER.

Witnesses:
D. D. KANE,
F. B. CURTIS (43)